United States Patent

Bergthaller et al.

[11] Patent Number: 4,461,827
[45] Date of Patent: Jul. 24, 1984

[54] COLOR PHOTOGRAPHIC RECORDING MATERIAL CONTAINING A NON-DIFFUSIBLE DYE RELEASER FROM WHICH A COMPLEXIBLE AZO DYE IS RELEASED DURING DEVELOPMENT

[75] Inventors: Peter Bergthaller; Günther Schenk, both of Cologne; Gerhard Wolfrüm, Leverkusen, all of Fed. Rep. of Germany

[73] Assignee: AGFA-Gevaert Aktiengesellschaft, Leverkusen, Fed. Rep. of Germany

[21] Appl. No.: 455,319

[22] Filed: Jan. 3, 1983

[30] Foreign Application Priority Data

Jan. 13, 1982 [DE] Fed. Rep. of Germany ....... 3200705

[51] Int. Cl.³ .................. G03C 5/54; G03C 7/00; G03C 1/40
[52] U.S. Cl. ................. 430/562; 430/223; 430/226
[58] Field of Search .............. 430/222, 223, 225, 226, 430/562

[56] References Cited

U.S. PATENT DOCUMENTS 4,142,891  3/1979  Baigtie et al. .......... 430/223
4,207,104  6/1980  Chapman et al. ........ 430/223
4,396,710  8/1983  Bergthaller et al. ..... 430/223

Primary Examiner—Richard L. Schilling
Attorney, Agent, or Firm—Connolly and Hutz

[57] ABSTRACT

Metal complexes, particularly copper and nickel complexes, of azo dyes corresponding to formula suitable for use as magenta-colored image dyes for the production of colored images by the dye diffusion transfer process. The dyes are linked (in non-metallized form) to a carrier radical provided with a ballast group as so-called color-providing compounds which are associated with a photosensitive silver halide emulsion layer. During development, the metallizable dyes are released imagewise and, after diffusion into an image-receiving layer, are converted into the corresponding metal complexes.

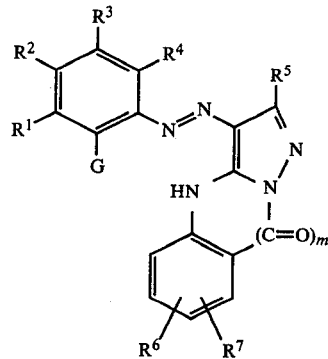

In formula II, $R^1$, $R^2$, $R^3$ and $R^4$ represent H, F, Cl, Br, —CN, —NO₂, —CF₃, —OCH₃, —SCF₃, alkyl, alkoxy, alkylthio, acylamino, alkyl sulphonyl, aryl sulphonyl, —CO—X or —SO₂Y; or two adjacent radicals from the group of radicals $R^1$ to $R^4$ together represent a fused benzene ring;

$R^5$ represents H, alkyl, alkoxy, aryl, alkoxy carbonyl, carbamoyl or cyano, $R^6$ and $R^7$ represent H, halogen, alkyl, —CF₃ or —SO₂—Y, G represents —OH or a hydrolyzable precursor thereof, X represents —OH, alkoxy or an amino group;

Y represents H, —OH, an amino group or a group of the formula —NH—SO₂—R⁸ where $R^8$ represents alkyl, aryl or an amino group; and m=0 or 1.

2 Claims, No Drawings

COLOR PHOTOGRAPHIC RECORDING MATERIAL CONTAINING A NON-DIFFUSIBLE DYE RELEASER FROM WHICH A COMPLEXIBLE AZO DYE IS RELEASED DURING DEVELOPMENT

This invention relates to a colour photographic recording material for the production of coloured images by the dye diffusion transfer process which contains, in association with at least one photosensitive silver halide emulsion layer, a non-diffusible colour-providing compound from which a diffusible, complexible azo dye is released during development.

In the dye diffusion transfer process, an imagewise distribution of diffusible dyes is produced during development in a photosensitive element in accordance with preliminary exposure and is transferred to an image-receiving element. In some cases, the fastness to light of dye images produced by this process may be improved in known manner by using dyes which are capable of being complexed by metal ions, for example tridentate azo dyes, and which form stable dye-metal complexes by treatment with suitable metal ions. The improvement in the fastness to light of azo dye images which have been obtained by the dye diffusion transfer process or by another photographic process, for example by the silver dye bleaching process, by complexing with metal ions is known, for example from DE-B No. 1 116 532 or DE-B No. 1 125 279.

U.S. Pat. No. 4,207,104 describes non-diffusible colour-providing compounds (dye releasers) (I) which, during development, release diffusible, red azo dyes capable of being metallised to form magenta-coloured metal complexes:

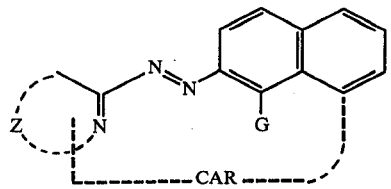

I in which formula,

G represents an OH-group, a salt thereof or a hydrolysable precursor function therefor, CAR represents a carrier radical, and Z represents the atoms required to complete a heterocyclic ring.

The examples mentioned therein include inter alia dyes from the following classes: 2-(2-pyridylazo)-1-naphthol-4-sulphonamides, 2-(2-pyrimidylazo)-1-naphthol-4-sulphonamides, and 2-(2-benzthiazole-azo)-1-naphthol-4-sulphonamides. Particular emphasis is placed on the clarity and light stability of the metal complexes. Where hydrolysable precursors are used for G, the tautomerism of the OH group is suppressed, i.e. the chromophore is fixed by acylation in a tautomeric form characterised by short-wave bands and relatively low extinction values. The use of the "shifted" form prevents the filter effect of the dye from leading to a loss of photographic sensitivity.

However, it is known that dyes shifted by acylation are not stable but instead are gradually de-acylated in the event of storage in the presence of residual moisture in a gelatin layer, so that the optical permeability of the layer gradually decreases during the storage period and, as a result, the associated photosensitive silver halide emulsion layer undergoes a loss of sensitivity.

Accordingly, it is desirable to use post-complexible monoazo dyes of the so-called tridentate type which, even without blocking of the hydroxyl group by acylation (in the form of an acylated phenolic hydroxyl group, as described in U.S. Pat. No. 4,148,643), show greatly reduced absorption and only reach the high extinction of the image dye complex after the complexing metal ion, preferably a nickel or copper ion, has exerted its effect.

It has been found that this problem can be solved particularly easily by using non-diffusible coupling products of suitable diazonium salts with pyrazolo-[1,5-a]-benzimidazoles or pyrazolo-[5,1-b]-quinazolones as dye releasers.

Accordingly, the present invention provides a colour photographic recording material for the production of coloured images by the dye diffusion transfer process, which material contains at least one non-diffusible colour-providing compound association with a photosensitive silver halide emulsion layer, a diffusible azo dye complexible by metal ions being released from the colour-providing compound under alkaline development conditions as a function of the development of the silver halide emulsion layer, characterised in that the azo dye corresponds to the following formula:

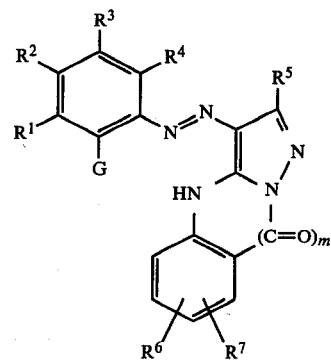

II in which $R^1$, $R^2$, $R^3$ and $R^4$, which may be the same or different, represent H, F, Cl, Br, —CN, —$NO_2$, —$CF_3$, —$OCF_3$, —$SCF_3$, alkyl, alkoxy, alkylthio, acylamino, alkyl sulphonyl, aryl sulphonyl, —CO—X or —$SO_2Y$; or two adjacent radicals from the group of radicals $R^1$ to $R^4$ together represent a fused benzene ring which may optionally contain other substituents, particularly halogen, —$NO_2$ or —$SO_2$—Y; $R^5$ represents H, alkyl, for example methyl, alkoxy, for example methoxy or ethoxy, aryl, particularly phenyl, alkoxy carbonyl, for example —$COOC_2H_5$, carbamoyl, particularly a carbamoyl group substituted once or twice on the nitrogen by alkyl, aryl or radicals for completing a cyclic amino group, for example

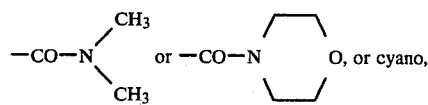

$R^6$, $R^7$ may be the same or different and represent H, halogen, particularly Cl, alkyl, —$CF_3$ or —$SO_2$—Y, G represents —OH or a hydrolysable precursor thereof, for example a hydrolysable acyloxy group, X represents —OH, alkoxy, an amino group optionally substituted by alkyl or aryl, or a cyclic amino group, Y represents H, —OH, an amino group optionally substituted once or twice by alkyl or aryl, a cyclic amino group or a group corresponding to the formula —NH—SO$_2$—R$^8$ where R$^8$ represents alkyl, for example methyl, aryl, for example phenyl or p-tolyl, an amino group optionally substituted twice by alkyl, or a cyclic amino group; m=0 or 1.

The dyes according to the invention are known from the article by Menzel, Pütter and Wolfrum in Angew. Chem. 74, 839-847 [1962].

The alkyl groups optionally present in the radicals R$^1$ to R$^7$ preferably contain no more than 4 C-atoms, preferred examples being methyl, ethyl, n-propyl, isopropyl and n-butyl.

The aryl groups optionally present in the radicals R$^1$ to R$^7$ are preferably phenyl groups; they may be further substituted, for example by alkyl, alkoxy, acylamino, sulphamoyl, sulphinate, but—including substituents such as these—preferably contain no more than 8 carbon atoms.

The cyclic amino groups mentioned are 5-membered to 7-membered, particularly saturated, cyclic amino groups, for example the pyrrolidine, piperidine or morpholine group.

Acyl radicals (acylamino) are generally derived from aliphatic or aromatic carboxylic or sulphonic acids, from carbamic acids or sulphamic acids or from carbonic acid semiesters. Hydrolysable acyl radicals in the group G capable of chelate formation are derived in particular from aliphatic carboxylic acids or carbonic acid semiesters.

In addition, the dyes corresponding to formula II for example in the form of some of the groups already mentioned in reference to R$^1$ to R$^7$ or in the form of substituents optionally attached to one of these groups through a suitable bond, have suitable functional groups at their disposal for adjusting a favourable diffusion and mordant behaviour, for example anionic or anionisable groups, such as sulphonate, sulphinate, phenolate, carboxylate, disulphimide or sulphamoyl groups, and also a functional group which results from the cleavage of a bond to a carrier radical provided with a ballast group and which is characteristic of the nature of the carrier radical and of the attachment thereto. The functional group just mentioned may be identical with the above-mentioned groups which modify diffusion and mordant behaviour. The functional group in question may be attached, for example, to an alkyl or aryl radical which in turn is part of one of the substituents mentioned with reference to R$^1$ to R$^7$.

In one preferred embodiment, the dye releasers used in accordance with the invention release dyes corresponding to formula II in which:

G represents —OH,

R$^1$, R$^2$, R$^3$ and R$^4$ represent H, Cl, —CN, —CO—X or —SO$_2$—Y,

R$^5$ represents methyl or phenyl,

R$^6$ and R$^7$ represent H, Cl, methyl, —CF$_3$ or —SO$_2$—Y (X and Y being as already defined), m=0 or 1, with the proviso that one of the radicals R$^1$, R$^2$, R$^3$ and R$^6$ represents the group

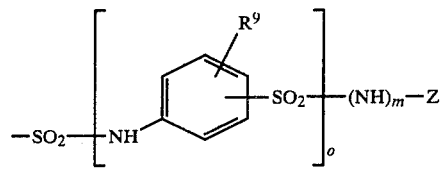

in which

Z represents H,

R$^9$ represents H, Cl, —CH$_3$, —OCH$_3$ or —OC$_2$H$_5$ and n, o=0 or 1.

It is characteristic of the dyes of formula II according to the invention that the absorption spectra of the dyes are shifted towards shorter wavelengths by comparison with those of the complexes. Although this does not necessitate alkali-labile blocking of the chelate-forming group G by acyl groups or related protective groups, acylation does produce a further shift in the absorption of the chromophore towards shorter wavelengths. In addition, it generally reduces the strength of colour so that the absorption of the layer containing the incorporated dye donor does not interfere with the sensitisation of the associated silver halide emulsion layer through a filter effect.

Formula II relates to the diffusible dyes according to the invention which are released during development. These dyes are released from corresponding incorporated non-diffusible colour-providing compounds (dye releasers). The compounds in question are compounds in which a dye radical corresponding to formula II is attached to a carrier radical CAR containing at least one ballast group, optionally with a suitable bond in between.

The dye corresponding to formula II may be attached to the carrier radical, for example, through one of the substituents R$^1$ to R$^7$. Accordingly, the dye releasers according to the invention may be represented by the following formula

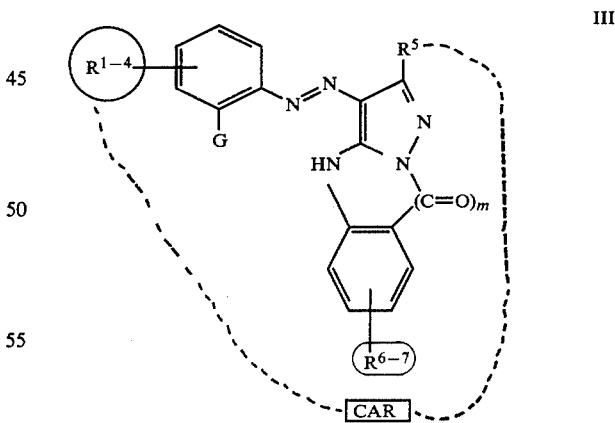

in which

R$^1$ to R$^7$, G and m are as defined above and

CAR represents a carrier radical containing at least one ballast radical, preferably a ballasted redox-active carrier radical, and the broken lines represent possible points of attachment.

In the dye releasers of formula III according to the invention, therefore, the carrier radical is present as a substituent in one of the groups represented by R$^1$ to R$^7$.

Preferred dye releasers according to the present invention contain the following group

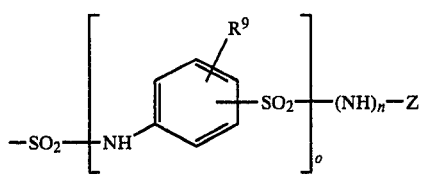

in which

Z represents CAR and CAR preferably represents a redox-active carrier radical containing at least one ballast radical.

In addition to the ballast radical, the carrier radical represented by CAR contains at least one group which is capable of being split as a function of the development of a silver halide emulsion layer, so that the dye attached to the carrier radical is released from the ballast radical(s), optionally together with a small fragment of the original carrier radical, and hence may be released from the anchorage in the layer. The carrier radicals may have various structures according to the manner in which the splittable group functions.

The dye releasers according to the invention may be, for example, non-diffusible colour couplers which contain a dye radical according to the present invention in the coupling position and which release that dye radical as a result of a chromogenic coupling reaction. Release mechanisms of the type in question are described, for example, in DE-C No. 1 095 115 and in U.S. Pat. No. 3,227,550.

However, redox-active dye donors corresponding to the following formula have proved to be particularly advantageous:

BALLAST—REDOX—DYE

In this formula,

BALLAST represents a ballast radical,

REDOX represents a group which is capable of being oxidised or reduced under alkaline development conditions and which undergoes a splitting reaction such as an elimination reaction, a nucleophilic displacement reaction or a hydrolysis reaction to a different extent, according to whether it is present in oxidised form or in reduced form, with the result that the DYE is released, and DYE represents the radical of a diffusible dye, in the present case a dye corresponding to formula II Ballast radicals are regarded as being radicals which enable the dye releasers according to the invention to be incorporated in non-diffusible form in the hydrophilic colloids normally used in photographic materials. Preferred radicals of this type are organic radicals which generally contain straight-chain or branched-chain aliphatic groups containing in general from 8 to 20 carbon atoms, optionally, also carbocyclic or heterocyclic, optionally aromatic, groups. These radicals are attached to the remaining part of the molecule either directly or indirectly, for example through one of the following groups: —NHCO—, —NHSO$_2$—, —NR—, where R represents hydrogen or alkyl, —O— or —S—. In addition, the ballast radical may also contain water-solubilising groups such as, for example, sulpho groups or carboxyl groups which may even be present in anionic form. Since the diffusion properties depend upon the size of the molecule of the compound used as a whole, it is sufficient in certain cases, for example when the entire molecule used is large enough, to use even shorter-chain radicals as ballast radicals.

Redox-active carrier radicals having the structure BALLAST—REDOX— and corresponding dye releasers are known in a variety of embodiments.

Oxidisable dye releasers which, after oxidation, undergo hydrolysis accompanied by the release of a diffusible dye are described, for example, in DE-A No. 22 42 762, DE-A No. 24 06 664, DE-A No. 25 05 246, DE-A No. 26 13 005, DE-A No. 26 45 656 and in the following Research Disclosure. Publications: No. 15 157 (November 1976), No. 15 654 (April 1977), No. 17 736 (January 1979). The compounds in question are primarily compounds in which a dye radical is attached to an oxidisable carrier radical through a sulphonamide group. Accordingly, the dye released during development contains a sulphamoyl group.

Oxidisable dye releasers which, in oxidised form, undergo an intramolecular displacement reaction accompanied by the release of a diffusible dye are described, for example, in U.S. Pat. No. 3,443,940. Dyes containing sulphinate groups are released from dye releasers of this type.

Examples of oxidisable carrier radicals from which, when they are present in oxidised form, a dye radical attached thereto is split off are given in the following:

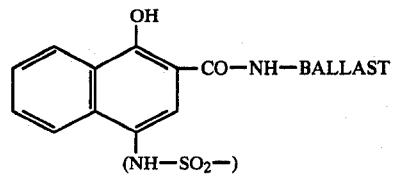

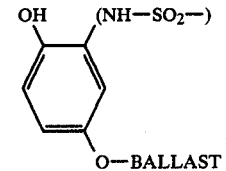

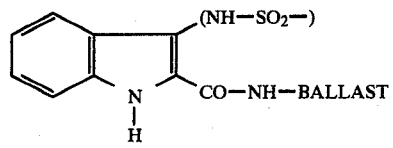

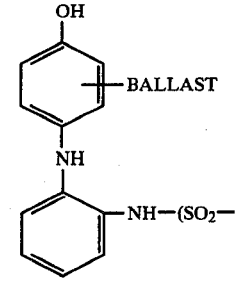

The groups in brackets are split off together with the dye radical. They remain as functional groups in the dye to which they are attached, optionally through an intermediate link.

With the types of dye releasers which have been mentioned thus far, the dye radicals are released in proportion to the rate of formation of an oxidation product by the development of silver halide or by catalytic intensification, for example with H₂O₂. Accordingly, this principle works as a negative process and, for the production of positive images, requires reversal, for example by the use of direct positive emulsions or by a layer arrangement working on the silver salt diffusion principle.

It is particularly advantageous for the carrier radical containing a ballast group and a redox portion to have a structure such that the diffusible azo dye is released substantially inversely proportionally to the state of development of the silver halide layer under alkaline conditions. In this case, the system in question is a system which works positively from the outset and which is suitable for the production of positive images using conventional negative silver halide emulsions. Dye releasers of this type are also known and are described in the following.

Oxidisable dye releasers which are stable in oxidised form but which, in non-oxidised form, undergo an intramolecular nucleophilic displacement reaction accompanied by the release of a dye radical, are described for example in DE-A No. 24 02 900 and in DE-A No. 25 43 902.

Oxidisable dye releasers which are stable in oxidised form but which, in non-oxidised form, release the dye in an elimination reaction are described in DE-A No. 28 23 159 and in DE-A No. 28 54 946.

The manner in which the last two of the above-mentioned groups of dye releasers function may be reversed by using the compounds in question in oxidised form rather than in reduced form. In this way, the types of dye releaser mentioned in the following are obtained.

Reducible dye releasers which, after reduction, undergo an intramolecular nucleophilic displacement reaction accompanied by the release of a dye radical are described in DE-A No. 28 09 716. These compounds are known as BEND-compounds (BEND = Ballasted Electron-accepting Nucleophilic Displacement).

Reducible dye releasers which, after reduction, undergo an elimination reaction accompanied by the release of a dye are described in EP-A No. 0 004 399 and in GB-A No. 80 12 242.

Other classes of reducible dye releasers which are capable of being reductively split by similar reaction mechanisms accompanied by the release of dyes are described in DE-A No. 30 08 588 and in DE-A No. 30 14 669.

Examples of reducible carrier radicals from which a dye radical attached thereto is split off by reduction are given in the following:

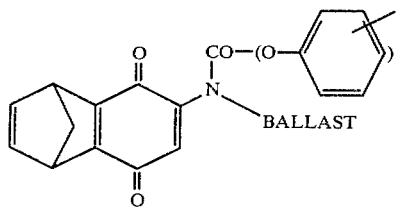

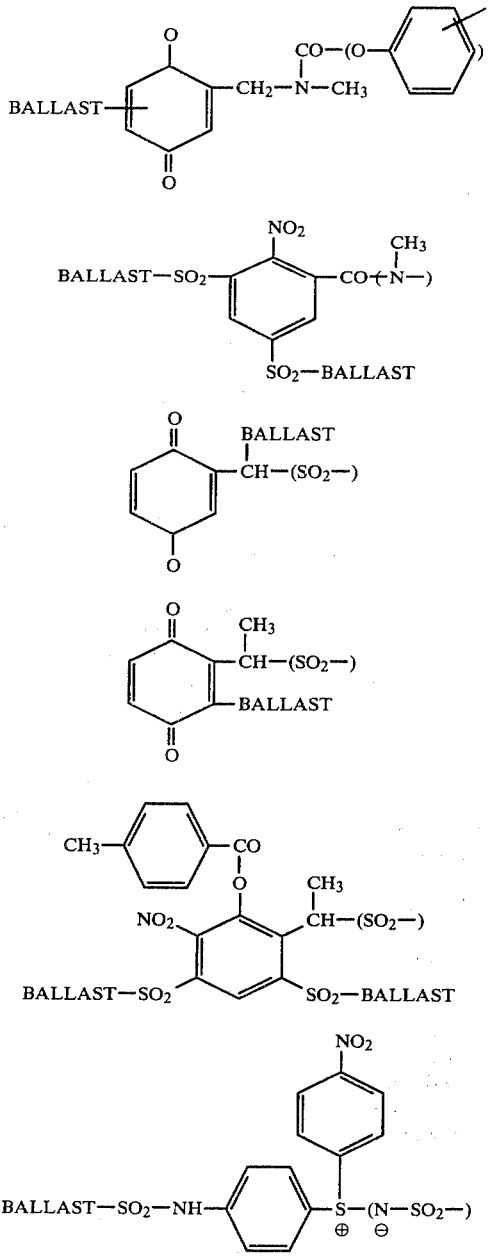

The groups in brackets are functional groups of the dye radical and are split off together with it from the remaining part of the carrier radical. The functional group may be one of the substituents which were mentioned in the definition of the radicals $R^1$ and $R^7$ in formula II and which have a direct influence upon the absorption and complexing properties of the dyes of formula II according to the invention. On the other hand, however, the functional group may also be separated from the chromophore of the dye according to the invention by an intermediate link, being present as a substituent in one of the groups defined for $R^1$ to $R^7$ without the absorption and complexing properties having to be influenced in any way. However, the functional group, optionally together with the intermediate link, may be of importance to the diffusion and mordant behaviour of the dyes according to the invention. Suitable intermediate links are, for example, alkylene or arylene groups.

The classes just mentioned of reducible dye releasers capable of being split by reduction are best used together with so-called electron donor compounds (ED-compounds). Electron donor compounds act as a reducing agent which is consumed imagewise during development of the silver halide and which, through its non-consumed fraction, in turn reduces the associated dye releaser, thereby releasing the dye. Suitable ED-compounds are, for example, non-diffusible or substantially non-diffusible derivatives of hydroquinone, benzisoxazolone, p-aminophenol or ascoric acid (for example ascorbyl palmitate), which are described, for example, in DE-A No. 28 09 716. Particularly favourable ED-compounds are described in DE-A No. 30 06 268.

Examples of suitable ED-compounds are given in the following:

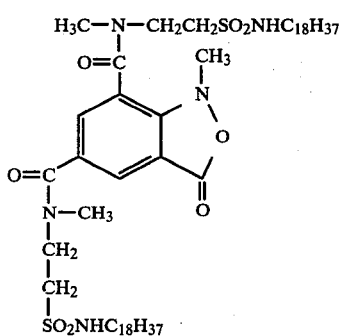
ED 1

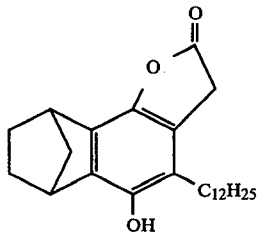
ED 2

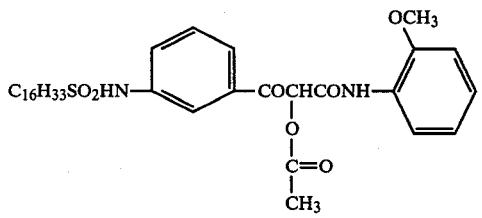
ED 3

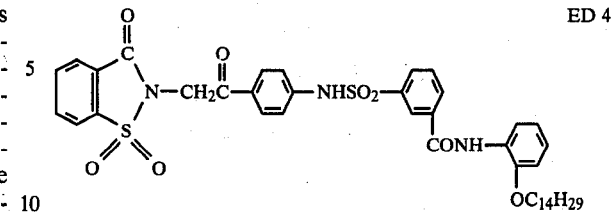
ED 4

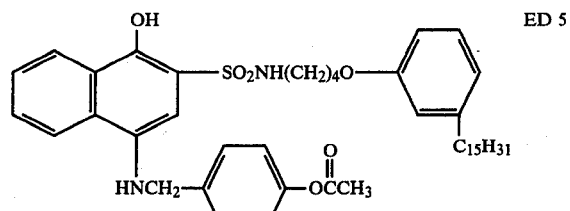
ED 5

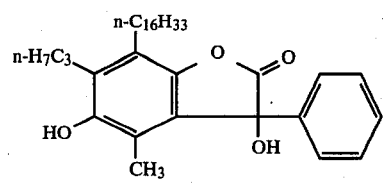
ED 6

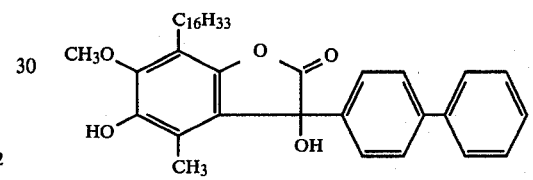
ED 7

Examples of monoazo dyes of formula II according to the invention which are capable of being metallised to form magenta-coloured nickel or copper complexes characterised by favourable absorption and excellent fastness to light are given in the following.

The dyes marked with an asterisk (*) are model dyes which may be attached to removable carrier radicals to form dye releasers of formula III by known preparative techniques without any troublesome changes either in their fastness to light or in their absorption.

The information ascertainable from the model dyes as to complex hue and fastness to light also applies to the suitable dye which contains removable groups.

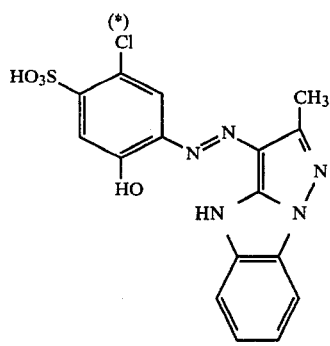
Dye No. 1

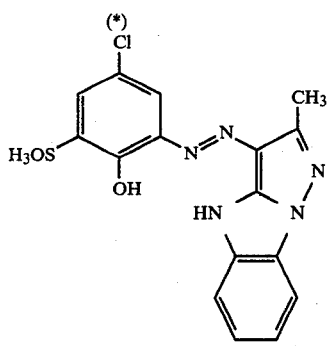
Dye No. 2

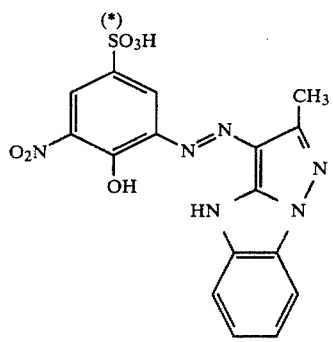 Dye No. 3
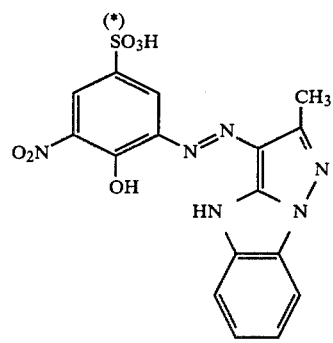 Dye No. 4
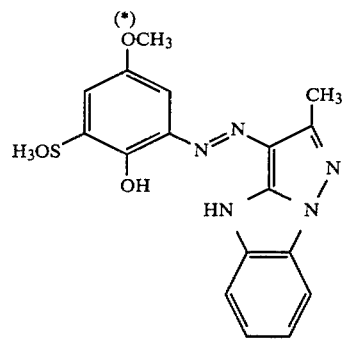 Dye No. 5
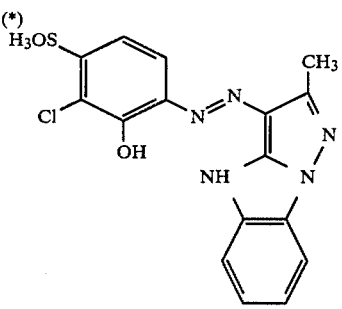 Dye No. 6
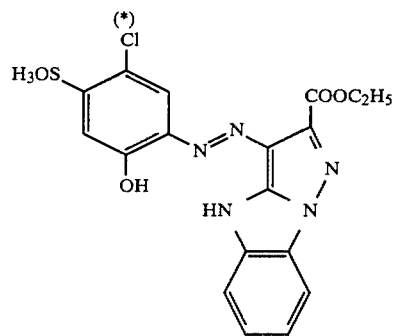 Dye No. 7
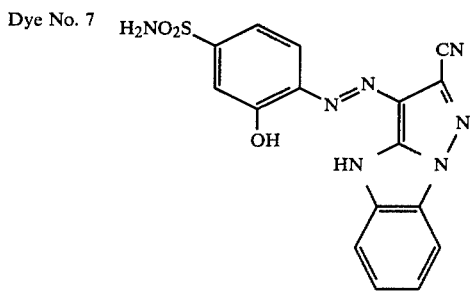 Dye No. 8
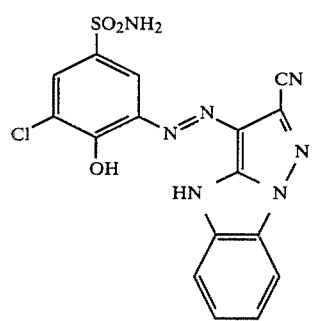 Dye No. 9
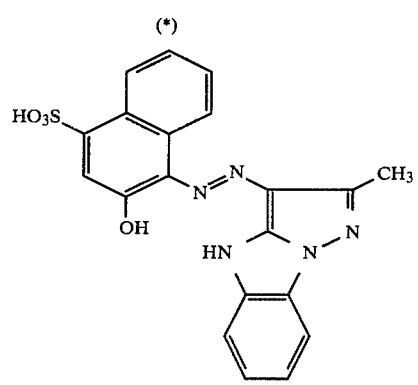 Dye No. 10

-continued
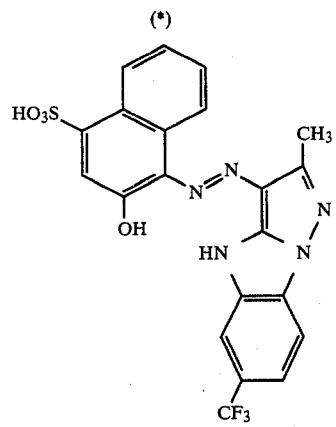 Dye No. 11
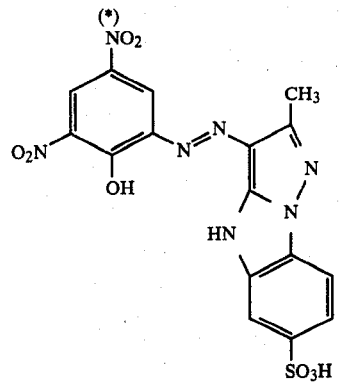 Dye No. 12
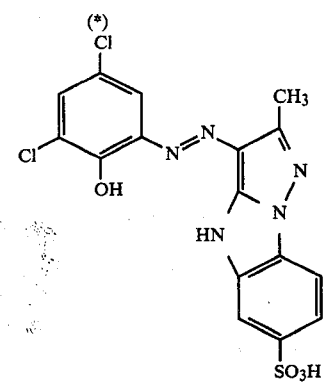 Dye No. 13
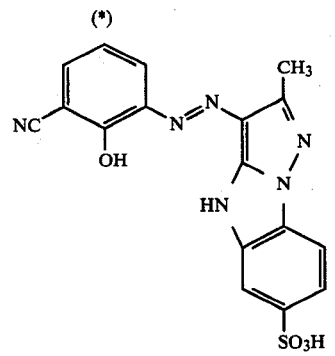 Dye No. 14
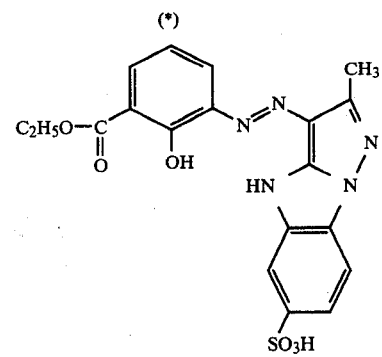 Dye No. 15
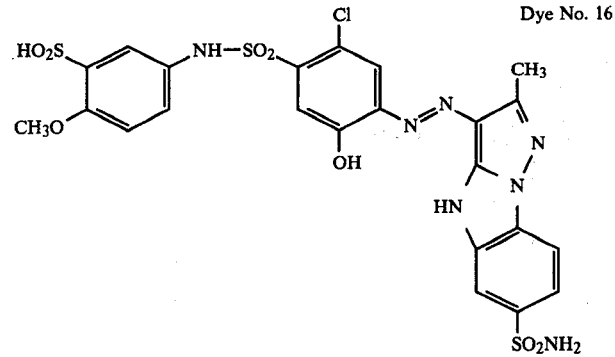 Dye No. 16
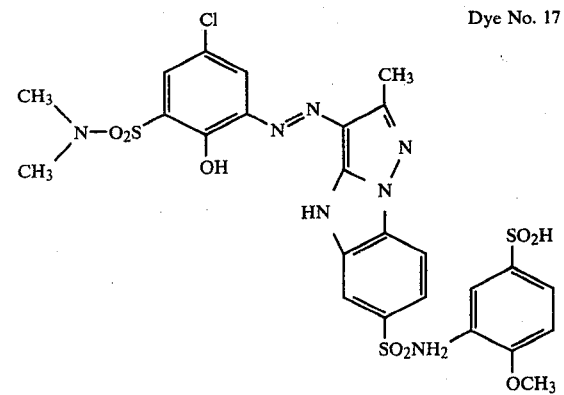 Dye No. 17

-continued
Dye No. 18
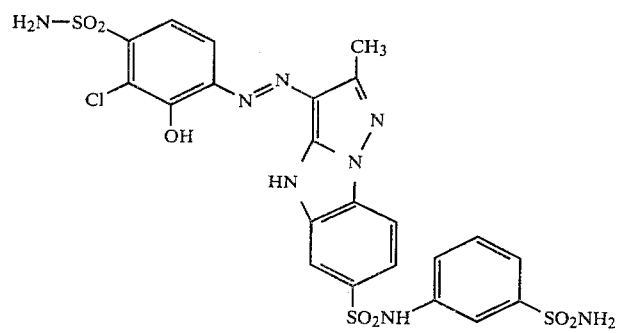
Dye No. 19
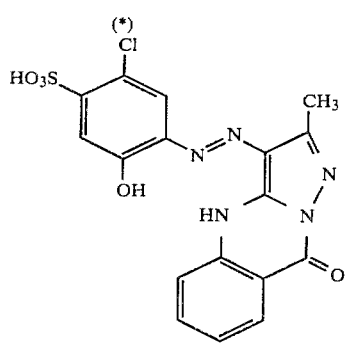
Dye No. 20
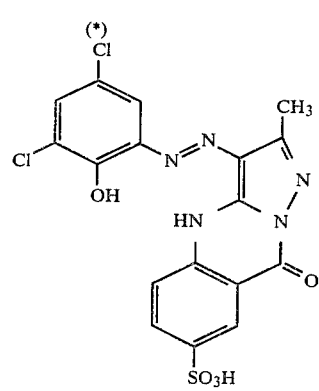
Dye No. 21
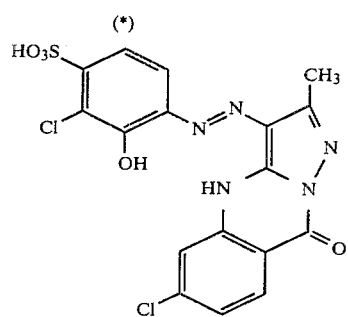
Dye No. 22
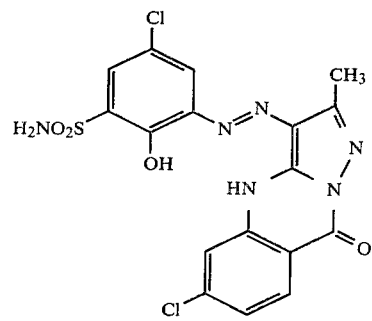
Dye No. 23
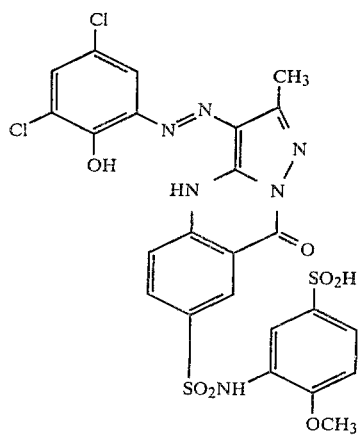
Dye No. 24
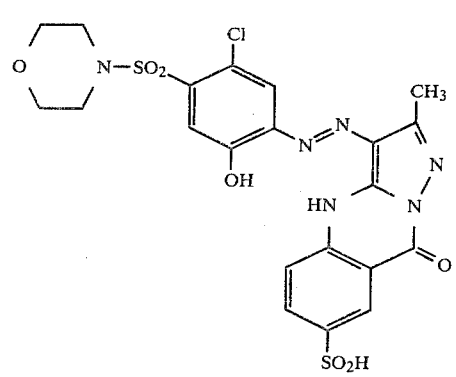

-continued
Dye No. 25
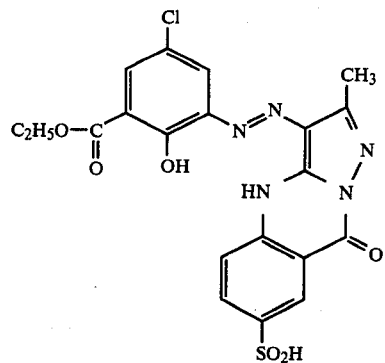
Dye No. 26
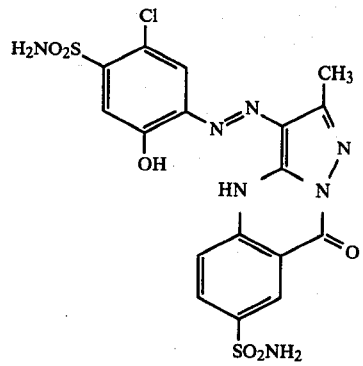
Dye No. 27
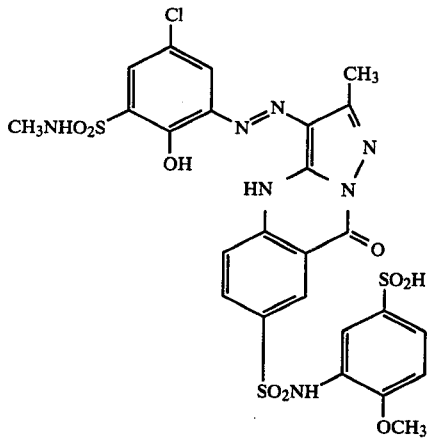
Dye No. 28
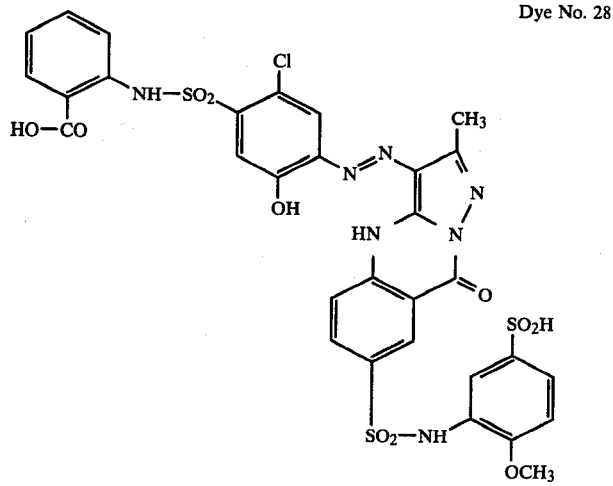
Dye No. 29
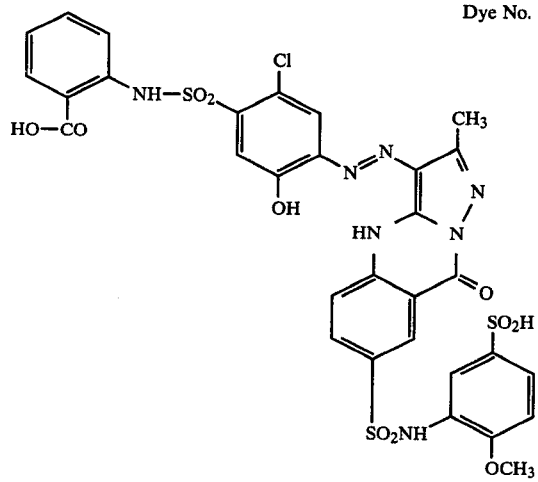
Dye No. 30
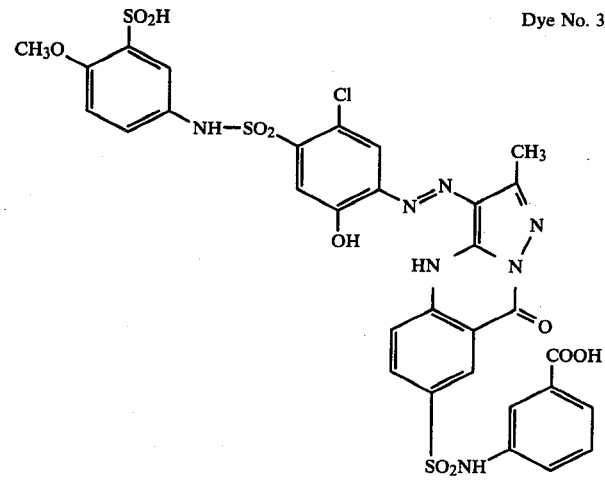
Dye No. 31
(*)
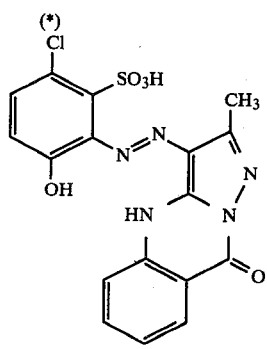
Dye No. 32
(*)
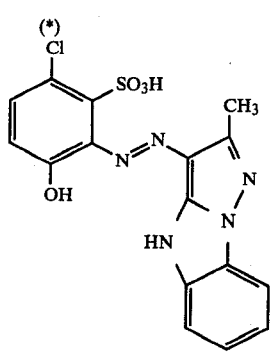

Dye No. 33 (*)

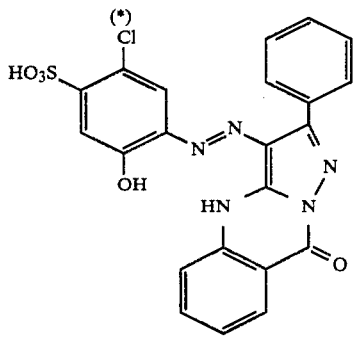

Dye No. 34 (*)

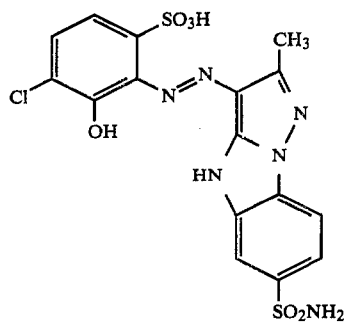

The dyes are produced in known manner by coupling diazotised amines corresponding to the following formula:

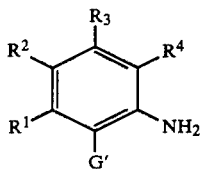

IV in which $R^1$, $R^2$, $R^3$ and $R^4$ are as defined above and $G'$ represents G or a group replaceable by G, for example halogen or $-OSO_3^\ominus$, with coupling components corresponding to the following formula:

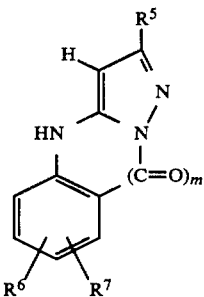

V in which $R^5$, $R^6$ and m have the same meaning as in formula II, in an aqueous, organic or aqueous organic medium.

The following are examples of suitable diazo components corresponding to formula IV: 2-aminophenol-5-sulphonic acid, 2-aminophenol-5-sulphonamide, 2-aminophenol-5-sulphonic acid anthranilide, 4-chloro-2-aminophenol-5-sulphonic acid, 4-chloro-2-aminophenol-5-sulphonamide, 4-chloro-2-aminophenol-5-sulphonic acid dimethylamide, 4-chloro-2-aminophenol-5-sulphonic acid morpholide, 4,6-dichloro-2-aminophenol-5-sulphonic acid, 6-chloro-2-aminophenol-5-sulphonic acid, 6-chloro-2-aminophenol-4-sulphonic acid, 6-chloro-2-aminophenol-4-sulphonic acid anthranilide, 6-chloro-2-aminophenol-4-sulphonic acid dimethylamide, 4-chloro-2-aminophenol-6-sulphonic acid, 4-chloro-2-aminophenol-6-sulphonic acid methylamide, 4-methoxy-2-aminophenol-5-sulphonic acid, 4-acetamino-2-aminophenol-6-sulphonic acid, 2-aminophenol-6-carboxylic acid, 2-aminophenol-6-carboxylic acid ethyl ester, 2-hydroxy-3-aminobenzonitrile, 2-aminophenol-6-carboxylic acid dimethylamide, 4-chloro-2-aminophenol-carboxylic acid ethyl ester, 4-chloro-2-aminophenol-3-sulphonic acid, 6-chloro-2-aminophenol-3-sulphonic acid, 2-amino-4,6-dichlorophenol, 2-amino-4,6-dinitrophenol, 2-amino-4,6-bis-trifluoromethyl phenol, 5-methyl sulphonyl-2-aminophenol, 3-amino-4-hydroxy diphenyl sulphone, 6-hydroxy-7-aminobenzothiazole-1,1-dioxide, 1-amino-2-naphthol-4-sulphonic acid, 1-amino-2-naphthol-6-sulphonic acid, 1-amino-2-naphthol-4-sulphonic acid anthranilide, 1-amino-2-naphthol-4-sulphonic acid dimethylamide, 2-amino-2-naphthol-6-sulphonic acid, and 2-amino-naphthol-4-sulphonic acid.

The following are examples of suitable coupling components corresponding to formula V: 2-methyl pyrazolo-[1,5-a]-benzimidazole, 2-methyl pyrazolo-[1,5-a]-benzimidazole-6-sulphonic acid, 2-methyl pyrazolo-[1,5-a]-benzimidazole-6-sulphonamide, 2-methyl-6-trifluoromethyl pyrazolo-[1,5-a]-benzimidazole, 2-methyl pyrazolo-[1,5-a]-benzimidazole-6-sulphonic acid anthranilide, 2-methoxy-6-trifluoromethyl pyrazolo-[1,5-a]-benzimidazole, 2-methoxy pyrazolo-[1,5-a]-benzimidazole-6-sulphonic acid dimethyl amide, pyrazolo-[1,5-a]-benzimidazole-2-carboxylic acid ethyl ester, 2-cyanopyrazolo-[1,5-a]-benzimidazole, 2-methyl pyrazolo-[5,1-b]-quinazolone, 2-methyl pyrazolo-[5,1-b]-quinazolone-7-sulphonic acid, 2-methyl pyrazolo-[5,1-b]-quinazolone-7-sulphonamide, 2-methyl pyrazolo-[5,1-b]-sulphonic acid anthranilide, 2-methyl pyrazolo-[5,1-b]-quinazolone-7-sulphonic acid dimethyl amide, 2-methyl-5-chloropyrazolo-[5,1-b]-quinazolone, 2-methyl-7-chloropyrazolo-[5,1-b]-quinazolone, and 2-methyl pyrazolo-[5,1-b]-quinazolone-7-sulphonic acid-N-benzene sulphonyl amide.

Useful information on the production of the coupling components (V) used in accordance with the invention may be found in Menzel, Wolfrum, Putter: Angew. Chem. 74, 839–47 and in DD-A No. 146 514, DE-B No. 1 299 224 and in the Article by Menzel and Puschel in "Mitteilungen aus den Forschungslaboratorien der Agfa-Gevaert AG", Vol. IV [1964], pages 376–385.

The production of the dyes according to the invention is explained in the following with the aid of a few representative examples:

Dye No. 1

A solution of 22.4 g of 4-chloro-2-aminophenol-5-sulphonic acid, 7.6 g of sodium nitrite and 4.5 g of NaOH in 200 ml of water was filtered at 0° to 2° C. and poured onto a mixture of 40 ml of concentrated hydrochloric acid and 200 g of ice. After standing for 1 hour at 0° to 5° C., the excess nitrite was eliminated with amidosulphonic acid and the reaction mixture was introduced dropwise into a mixture of 19 g of 2-methyl pyrazolo-

[1,5-a]-benzimidazole and 300 ml of methanol which had been poured over 100 ml of a saturated potassium carbonate solution. With intensive stirring at 0° to 5° C., coupling took place in 30 minutes.

After stirring for 1 hour at room temperature, the pH-value was adjusted to 5-6 with acetic acid. The dye precipitated was recrystallised from a 10% sodium acetate solution. Yield: 24 g: orange-coloured powder.

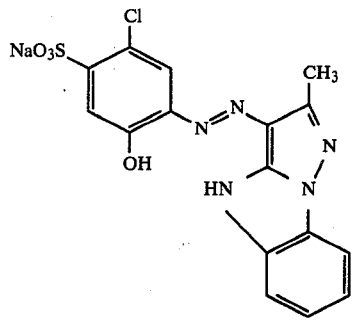

Dye No. 4

23.4 g of 6-nitro-2-aminophenol-4-sulphonic acid were dissolved with 10 g of sodium hydroxide in 300 ml of warm water (approximately pH 9). After the addition of a solution of 7.3 g of sodium nitrite in 25 ml of water, the filtered solution was poured into a mixture of 40 ml of concentrated hydrochloric acid and 200 g of ice and the temperature was kept between 0° and 2° C. by the addition of more ice (approximately 150 g). After 1 hour at that temperature, the excess nitrite was eliminated by the addition of amidosulphonic acid.

The diazonium solution was then introduced with intensive stirring over a period of 30 minutes at 0° to 5° C. into a two-phase mixture of 20 g of 2-methoxy pyrazolo-[1,5-a]-benzimidazole and 100 ml of saturated potassium carbonate solution in 300 ml of methanol. The temperature of the mixture was left to rise to room temperature over a period of 2 hours, after which the mixture was adjusted to pH 4 with acetic acid and filtered under suction. The dye precipitated was recrystallised once from 10% NaCl solution and once from 10% Na acetate solution. Yield: 13.8 g; scarlet-red powder.

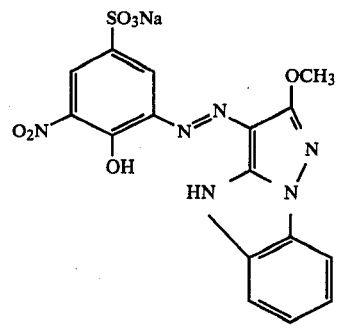

Dye No. 20

21.5 g of 4,6-dichloro-2-aminophenol hydrochloride were suspended in 200 ml of 20% hydrochloric acid and the resulting suspension was diazotised by the dropwise addition of 5° to 10° C. of 75 ml of 10% sodium nitrite solution. After a reaction time of 1 hour, excess nitrite was eliminated with amidosulphonic acid and the diazonium salt suspension was introduced at 0° C. into a solution of 31 g of Na-2-methyl pyrazolo-[5,1-6]-quinazolone-7-sulphonate and 140 g of anhydrous sodium carbonate in 700 ml of water. The pH was kept alkaline by the addition of 2N NaOH solution. After stirring for 2 hours at room temperature, the pH was adjusted to pH 4 with acetic acid. The dye precipitated was filtered off under suction, dissolved in hot water and precipitated by the addition of 20% NaCl solution. Yield: 45 g; brown-red crystals.

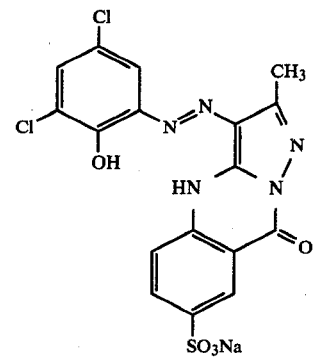

The production of non-diffusible redox-active dye donors, using dye fractions which are capable of splitting off post-complexible 3-(2-hydroxyarylazo)-pyrazolo-benzimidazoles or 3-(2-hydroxyphenylazo)-pyrazolo-quinazolones of formula II, is described in the following with the aid of a few representative examples:

Dye releaser No. 1

-continued

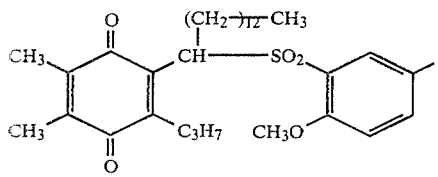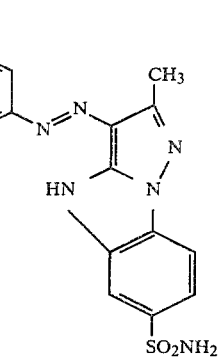

(a) 5-chloro-2-methyl benzoxazole-6-sulphochloride

Production from the pyridinium salt of diacetylated 4-chloro-2-aminophenol-5-sulphonic acid is carried out by stirring with an excess of phosphorus pentachloride on a steam bath and pouring onto ice. Yield: 60%. The substance is stable for a short time only.

(b) 2,3-dimethyl-5-propyl-6-[α-(2-methoxy-5-aminobenzenesulphonyl)-tetradecyl]-1,4-benzoquinone 30 ml of 20% sulphuric acid were added dropwise with stirring to 19.6 g of 2,3-dimethyl-5-propyl-6-(α-hydroxytetradecyl)-hydroquinone (the production of which is described in EP-A No. 0 004 399) and 11.1 g of 2-methoxy-5-aminobenzene sulphinic acid in 300 ml of glacial acetic acid. After 15 minutes at 60° C., 30 g of iron(III)chloride hexahydrate were added and the mixture was kept at 60° C. for another 20 minutes.

After stirring into water, a viscous non-crystallising oil was obtained and proved to be stable for several months.

(c) 2,3-dimethyl-5-propyl-6-[α-(2-methoxy-5-<2-chloro-4-amino-5-hydroxy>-benzene-sulphonamido-benzenesulphonyl)-tetradecyl]-1,4-benzoquinone 25 g of the quinone compounds obtained in accordance with (b), the content of which was found by amino group determination to amount to 92%, were reacted with 15 g (37% excess) of 5-chloro-2-methylbenzoxazole-6-sulphochloride in 150 ml of pyridine over a period of 24 hours at a temperature of 0° to 5° C. The crude product was isolated by stirring into 300 g of ice, taken up in 500 ml of glacial acetic acid and, following the addition of 10 ml of $H_2SO_4$, was heated for 1 hour on a steam bath. After pouring onto 1000 g of ice, the product was left to stand overnight. After filtration under suction and repeated digestion with methanol or 50% acetic acid, 28 g of an ochre-coloured powder were obtained.

(d) following the addition of 4 ml of trifluoroacetic acid, 15.3 g of the aminophenol quinone (0.002 mole) obtained in accordance with (c) were diazotised with 3.4 ml of isoamyl nitrite in 400 ml of acetone at 0° C. After standing for 2 hours at 0° to 5° C., the excess nitrite was eliminated by the addition of 1 g of urea and the solution was stirred at 5° to 10° C. into a two-phase mixture of 6 g of 2-methyl pyrazolo-[1,5-b]-benzimidazole-6-sulphonamide and 50 ml of a saturated potassium carbonate solution in 300 ml of acetone. After stirring for 2 hours at 10° C., the mixture was poured onto 500 g of ice. After neutralisation with acetic acid, the dye releaser was extracted with ethyl acetate and the impurities were separated off by column chromatography on 400 g of silica gel using ethyl acetate/isopropanol (carmine-red band).

After the eluate fractions containing the dye had been concentrated by evaporation, 14 g of dye releaser No. 1 were obtained in the form of a red powder.

Approximately 0.01 g of dye No. 16 were obtained by heating 0.05 g of dye releaser No. 1 with 0.5 g of ascorbic acid and 0.5 g of KOH in methyl glycol.

Dye releaser No. 2

-continued

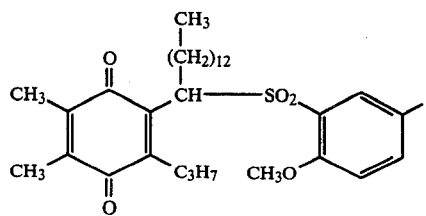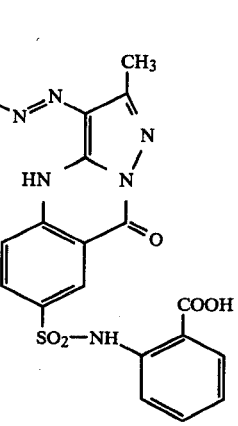

(e) the diazonium solution in acetone described in (d) with reference to the preparation of dye releaser No. 1 was introduced at pH 9–12 and with cooling to 5° C. into a solution of 8 g of 2-methyl pyrazolo-[5,1-b]-quinazolone-7-sulphonic acid anthranilide in 400 ml of methyl glycol to which 10% aqueous sodium hydroxide had been added. The reaction product was worked up by pouring onto 1000 g of ice and 100 ml of acetic acid, and the crude product obtained was repeatedly dissolved in carbonate solution and reprecipitated with hydrochloric acid. 13 g of a dark red powder were obtained after purification by chromatography. 0.02 g of dye No. 30 were released from 0.05 g of dye releaser No. 2 by digestion with 0.5 g of ascorbic acid and 0.5 g of KOH in 10 ml of hot methyl glycol, followed by chromatographic purification.

phenyl)-3-amino-indole under conditions similar to those described in DE-A No. 25 05 248 by reaction with 3-nitrobenzene sulphochloride and catalytic reduction over Raney nickel. (p) the sulphochloride obtained in accordance with (n) and the indole derivative obtained in accordance with (o) were reacted under the conditions specified in DE-A No. 25 05 248 (Production Example 4).

After chromatographic purification on silica gel in a nitrogen atmosphere, dye releaser No. 3 was obtained in a yield of 54%.

The dye releasers according to the invention are incorporated in association with a photosensitive silver halide emulsion layer in a colour photographic recording material for the dye diffusion transfer process. For use in monochromatic processes, a recording material Dye releaser No. 3

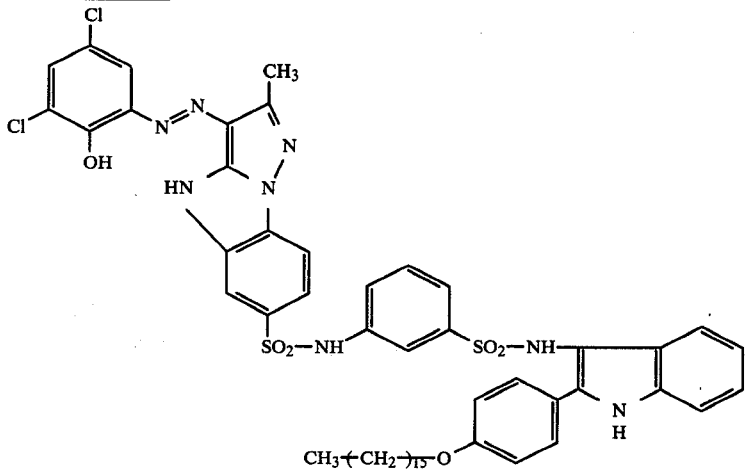

(n) 20 g of the pyridinium salt of dye No. 13 were heated on a steam bath for 60 minutes with 20 g of acetanhydride and 20 g of pyridine. After the addition of 40 g of PCl₅, the evaporation residue was heated to liquefaction on the steam bath. The sulphochloride was precipitated by introduction into 100 g of ice and 20 g of NaCl, taken up in ethyl acetate and treated according to (p) immediately after the solution had been dried with NaCl.

(o) 2-(4-hexadecyloxyphenyl)-3-(3-aminobenzene-sulphoamido)-indole was prepared from 2-(4-cetyloxyof the type in question contains at least one and, for use in processes for the production of multicolour images, generally at least three photosensitive silver halide emulsion layers, in the latter case with different spectral sensitivity, a dye releaser corresponding to formula III being associated with at least one of these layers in accordance with the present invention. On development, the dye releasers of the present invention yield diffusible dyes which, after diffusion into an image-receiving layer, are complexed with nickel or copper ions to form magenta images dyes. Because of this, the dye releasers according to the invention are preferably associated with a green-sensitive silver halide emulsion layer.

In the context of the invention, "association" and "associated" are understood to mean that the mutual arrangement of the photosensitive silver halide emulsion layer and the dye realeaser is such that, on development, they are able to enter into an interaction enabling the diffusible azo dye complexible by metal ions to be released in accordance with the development of the silver halide emulsion layer. For this purpose, the photosensitive silver halide and the dye releaser do not necessarily have to be present in the same layer; instead, they may be accommodated in adjacent layers respectively belonging to the same layer unit. In cases where the dye releasers according to the invention are reducible compounds which are capable of being split by reduction and which are best used in conjunction with ED-compounds (or their precursors, for example in accordance with DE-A No. 30 06 268), association is understood to mean that the mutual arrangement of the silver halide emulsions, the ED-compound or its precursor and the dye releaser is such as to enable them to enter into an interaction which provides for imagewise consistency between the silver image formed and the consumption of ED-compound on the one hand and between the unused ED-compound and the dye releaser on the other hand, so that an imagewise distribution of diffusible dye is produced in accordance with the undeveloped silver halide.

Although the dye releasers according to the invention may be incorporated by a variety of different methods, it has proved to be favourable to incorporate these releasers in the layers in the form of emulsates using so called oil formers. The advantage of this, particularly where reducible dye releasers capable of being split by reduction are used in combination with ED-compounds, is that the dye releasers and the ED-compounds may be brought into particularly close functional contact in the form of a common emulsate. Suitable oil formers are described, for example, in U.S. Pat. No. 2,322,027, DE-A No. 1,772,192, DE-A No. 2,042,659 and DE-A No. 2,049,689. The optimal quantities of the dye releaser to be incorporated and the ED-compound, if any, may be determined by simple routine tests. The dye releaser according to the present invention is used, for example, in quantities of from 0.05 to 0.2 mole and the ED-compound, if present, in quantities of from 0.1 to 0.6 mole per mole of silver halide.

The development of the colour photographic recording material according to the invention after it has been exposed imagewise is initiated by treatment with an aqueous-alkaline, optionally highly viscous developer solution. The auxiliary developer compounds required for development are either contained in the developer solution or may be completely or partly contained in one or more layers of the colour photographic recording material according to the invention. During development, diffusible dyes are released imagewise from the dye releasers and transferred to an image-receiving layer which is either an integral part of the colour photographic recording material according to the invention or is in contact therewith at least during the development period. Accordingly, the image-receiving layer may be arranged on the same layer support as the photosensitive element or on a separate layer support. It consists essentially of a binder which contains mordants for fixing the diffusible dyes released from the non-diffusible dye releasers. Preferred mordants for anionic dyes are longchain quaternary ammonium or phosphonium compounds, for example of the type described in U.S. Pat. No. 3,721,147 and in U.S. Pat. No. 3,271,148. It is also possible to use certain metal salts and their hydroxides which form sparingly soluble compounds with the acid dyes. In addition, it is even possible to use polymeric mordants, for example those of the type described in DE-A No. 23 15 304, DE-A No. 26 31 521 or DE-A No. 29 41 818. The dye mordants are dispersed in the mordant layer in one of the usual hydrophilic binders, for example in gelatin, polyvinyl pyrrolidone, or completely or partly hydrolysed cellulose esters. Some binders may, of course, also function as mordants, as is the case, for example, with polymers of nitrogen-containing quaternary bases, such as for example polymers of N-methyl-2-vinyl pyridine, as described for example in U.S. Pat. No. 2,484,430. Other suitable mordant binders are, for example, guanyl hydrazone derivatives of alkyl vinyl ketone polymers, as described for example in U.S. Pat. No. 2,882,156, or guanyl hydrazone derivatives of acyl styrene polymers, as described for example in DE-A No. 2 009 498. In general, however, other binders, for example gelatin, will be added to mordant binders of this type.

In addition, the image-receiving layer or an adjacent layer may in the present case contain heavy metal ions, particularly copper or nickel ions, which form with the diffusing tridentate azo dyes according to the invention the corresponding azo dye/metal complexes with the abovementioned advantageous properties in regard to absorption and stability. The metal ions may be bound in complex form in the image-receiving layer, for example to certain polymers of the type described, for example, in Research Disclosure 18534 (September 1979) or in DE-A No. 3 002 287 and DE-A No. 3 105 777. However, it is also possible to produce the azo dye/metal complexes after diffusion in the image-receiving layer by treating the image-receiving layer, including the imagewise distribution of dyes according to the invention formed therein, with a solution of a salt of one of the above-mentioned heavy metals. The dye releasers of formula III which remain behind imagewise (as a negative to the transfer image) during development in association with the originally photosensitive layers may be converted by treatment with heavy metal ions into the corresponding azo dye/metal complexes ("retained image"). In either case, the dye image produced with the colour photographic material according to the invention consists of an imagewise distribution of metal complexes, particularly nickel or copper complexes of the dye releasers of formula III according to the invention or of the azo dyes of formula II released therefrom and optionally other dyes which, in the latter case, are fixed in the image-receiving layer by means of the mordants contained therein.

If the image-receiving layer remains in layer contact with the photosensitive element, even after development has been completed, an alkali-permeable pigment-containing light-reflecting binder layer is generally situated between them, acting as an optical division between negative and positive and as an aesthetically attractive image background for the transferred dye image. A light-reflecting layer such as this may be preformed in known manner in the photosensitive colour photographic recording material or, alternatively, may only be formed during development, again in known manner. If the image-receiving layer is arranged between the layer support and the photosensitive element and if it is separated from the photosensitive element by a preformed light-reflecting layer, either the layer support has to be transparent, so that the dye transfer image produced can be viewed through it, or alternatively the photosensitive element has to be removed together with the light-reflecting layer from the image-receiving layer to expose the latter. However, the image-receiving layer may also be present as the uppermost layer in an integral colour photographic recording material, in which case exposure best takes place through the transparent layer support.

APPLICATION EXAMPLE 1

Image Receiving Sheet 1

The following layers are applied to a paper support coated on both sides with polyethylene. All the quantities quoted are based on one square meter.

(1) A mordant layer containing 6 g of the cationic polyurethane according to Example 3 of DE-A No. 2 631 521 and 5 g of gelatin.

(2) A hardening layer containing 0.1 g of gelatin and 0.15 g of an instant hardener having the following structure

Two strips of the image-receiving material obtained were immersed in 0.03 molar solutions, made alkaline with 2% sodium hydroxide, of dyes A,B,C and D (comparison dyes according to U.S. Pat. No. 4,207,104 and Research Disclosure . . . ) and of dyes 1,2,3,10,12,13,19,20 and 22 according to the invention until the dried layer had a density of at least 1.0, as measured behind a blue filter. Comparison dyes:

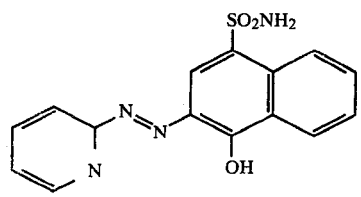

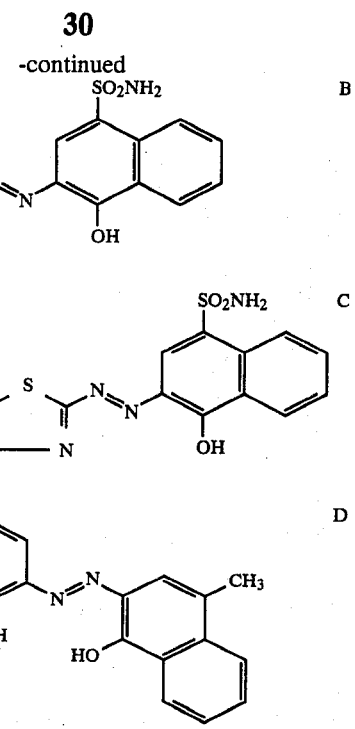

The strips were then metallised by immersion for 30 seconds in a 2% nickel acetate solution, rinsed with water and dried.

One half of each strip was exposed to high-intensity exposure in a Xeno-test apparatus, the radiation dose amounting to $4.8 \cdot 10^6$ lux hours (lx·h).

The properties (absorption maximum and half band width in nm, increase in density in percent on metallisation, as measured behind a green filter, the secondary densities measured behind blue and red filters and the relative density loss in percent as measured during high-intensity exposure) of the dye transfers obtained with the individual dyes and post-metallised with nickel-(II) are shown in the following Table.

TABLE 1

| | | | Ni—metallised dyes | | | |
| | | | Increase in density on metallisation (behind green filter) | Secondary densities behind | | Rel. density loss in the X-test |
| Dye | Max [nm] | Half band-width | | blue filter | red filter | |
| --- | --- | --- | --- | --- | --- | --- |
| A | 534 + 570 | 470–600 | +138% | 38% | 20% | −23% |
| B | 534 + 570 | 465–600 | +83% | 41% | 22% | −48% |
| C | 547 | 469–628 | +22% | 47% | 53% | −37% |
| D | — | — | −20% | — | — | −12% |
| 1 | 525 + 556 | 450–587 | +800% | 60% | 15% | −12% |
| 2 | 525 | 454–583 | −900% | 65% | 13% | −10% |
| 3 | 550 | 462–615 | +39% | 54% | 45% | −7% |
| 10 | 540 + 555 | | +110% | 57% | 23% | −18% |
| 12 | 540 + 560 | 440–592 | +106% | 62% | 18% | −7% |
| 13 | 525 | 456–574 | +400% | 68% | 10% | −9% |
| 19 | 530 | 468–592 | +85% | 53% | 19% | −14% |
| 20 | 532 | 461–591 | +105% | 54% | 25% | −4% |
| 22 | 529 | 464–596 | +200% | 54% | 26% | −11% |

As can be seen by comparing the metallised dye transfers with the non-metallised dye transfers, the dye transfers produced in accordance with the invention, particularly those produced with the 3-(2-hydroxyphenyl)-azopyrazolo-benzimidazoles, show a greater shift in the absorption maximum than the comparison dyes; in other words, they undergo a greater colour density increase in the main density, as measured behind a green filter. The colour density increase of the 3-(2-hydroxyphenyl)-azopyrazolo-quinazolones 19,20 and 22 is also greater on average than that of the comparison dyes A to C. Comparison dye D drops out of the series insofar as it undergoes a hypsochromic shift during metallisation. In addition, its hue is clouded and unattractive.

The major advantage afforded by the dyes according to the present invention is in the results of the light fastness test in which none of the dyes loses more than 18% after 48 hours in a Xeno-test apparatus, whereas the hetaryl-azonaphthols according to U.S. Pat. No. 4,207,104 undergo a density loss of from 23 to 48%.

APPLICATION EXAMPLE 2

Photosensitive Element 1 (Comparison)

The following layers were successively applied to a paper support coated on both sides with polyethylene. All quantities quoted are based on 1 square meter.

1. A non-sensitised silver bromide iodide emulsion layer of 0.5 g of $AgNO_3$ containing 0.3 g of the comparison dye releaser E, 0.16 g of ED-compound No. 6 (=compound No. 4 from DE-A No. 30 06 268), 0.46 g of palmitic acid diethyl amide (common oil former for the dye releaser and the ED-compound) and 1.15 g of gelatin.
2. A protective layer containing 0.6 g of the monoacetylation product of 4-methyl-4-hydroxymethyl phenidone, 0.12 g of 2-isooctadecyl-5-sulphohydroquinone and 0.6 g of gelatin.
3. A hardening layer containing 0.1 g of gelatin and 0.12 g of the instant hardener according to Example 1.

Dye releaser E

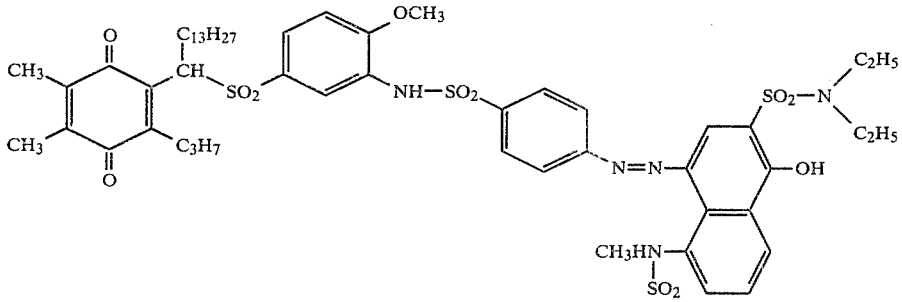

The photosensitive element exposed imagewise behind a step wedge and a strip of image-receiving layer 1 (Example 1) were impregnated with a solution having the following composition and pressed together in layer-to-layer contact: 925 g of $H_2O$, 30 g of isobutanol, 2 g of $Na_2SO_3$, 3 g of KBr and 40 g of KOH. After a contact time of 2 minutes, the sheets were separated from one another and the image-receiving sheet was rinsed in water for 30 seconds. After drying, the Dmin/Dmax values of the positive magenta colour wedge 1 were measured.

Photosensitive Elements 2 and 3 (according to the invention)

Photosensitive elements 2 and 3 differ from element 1 insofar as photosensitive element 2 contains 0.4 g of dye releaser 1 and 0.2 g of ED-compound No. 6 whilst photosensitive element 3 contains 0.4 g of dye releaser 2 and 0.25 g of ED-compound No. 6.

In addition, the emulsates each contained 0.9 g as opposed to 0.46 g of palmitic acid diethylamide. As in the case of photosensitive element 1, processing took place in contact with the image-receiving layer 1. After separation, the image-receiving layers were rinsed with demineralised water and metallised by immersion in a 2% nickel acetate solution. They were then neutralised in a succinic acid buffer bath (2% of succinic acid adjusted to pH 6) and dried, followed by determination of the Dmin/Dmax-values.

The colour wedges 1–3 obtained are exposed for 48 hours to a xenon arc ($4.8 \cdot 10^6$ lx·h).

The light fastness and photographic data are shown in the following Table:

TABLE 2

| Photosensitive element | Dye releaser | $D_{min}$ | $D_{max}$ | E [rel. log I · t] | $\frac{\Delta D}{Do}$ |
|---|---|---|---|---|---|
| 1 | E | 0.17 | 2.0 | 100 | −28% |
| 2 | 1 | 0.20 | 1.85 | 160 | −12% |
| 3 | 2 | 0.18 | 1.75 | 140 | −9% |

It can be seen from the data in the Table that technical advantages are achieved both by the increased sensitivity attributable to the lower extinction of the non-metallised dye releasers 1 and 2 and also by the increased lightstability of the nickel complexes in comparison with a conventional magenta dye.

We claim:

1. A colour photographic recording material for the production of coloured images by the dye diffusion transfer process, which material contains a non-diffusible colour-providing compound in association with at least one photosensitive silver halide emulsion layer, a diffusible azo dye complexible by metal ions being released from the colour-providing compound under alkaline development conditions as a function of the development of the silver halide emulsion layer, wherein the azo dye corresponds to the following formula:

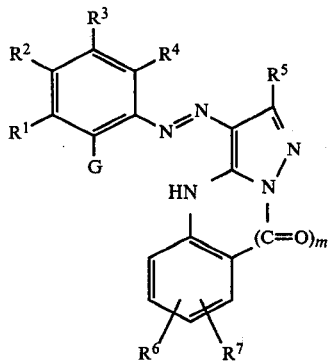 (II)

in which
- $R^1$, $R^2$, $R^3$ and $R^4$, which may be the same or different, represent H, F, Cl, Br, —CN, —NO$_2$, —CF$_3$, —OCF$_3$, —SCF$_3$, alkyl, alkoxy, alkylthio, acylamino, alkylsulphonyl, aryl sulphonyl, —CO—X or —SO$_2$—Y; or two adjacent radicals from the group of radicals $R^1$ to $R^4$ together represent a fused benzene ring;
- $R^5$ represents H, alkyl, alkoxy, aryl, alkoxy carbonyl, carbamoyl or cyano,
- $R^6$ and $R^7$, which may be the same or different, represent H, halogen, alkyl, —CF$_3$ or —SO$_2$Y,
- G represents —OH or a hydrolysable precursor thereof,
- X represents —OH, alkoxy, an amino group or a cyclic amino group,
- Y represents H, —OH, an amino group, a cyclic amino group or a group of the formula —NH—SO$_2$—R$^8$ where
- $R^8$ represents alkyl, aryl, an amino group or a cyclic amino group, and
- m=0 or 1.

2. A recording material as claimed in claim 1, wherein in formula II:
- G represents —OH,
- $R^1$, $R^2$, $R^3$ and $R^4$ represent H, Cl, —CN, —CO—X or —SO$_2$—Y,
- $R^5$ represents methyl or phenyl,
- $R^6$ and $R^7$ represent H, Cl, methyl, —CF$_3$ or —SO$_2$Y,
- X represents —OH, alkoxy, an amino group or a cyclic amino group,
- Y represents H, —OH, an amino group; a cyclic amino group or a group corresponding to the formula —NH—SO$_2$—R$^8$ where
- $R^8$ represents alkyl, aryl, a dialkylamino group or a cyclic amino group, and
- m=0 or 1, with the proviso that one of the radicals $R^1$, $R^2$, $R^3$ and $R^6$ represents the group

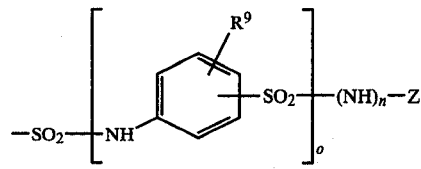

in which
- Z represents H,
- $R^9$ represents H, Cl, —CH$_3$, —OCH$_3$ or —OC$_2$H$_5$,
- n=0 or 1 and
- o=0 or 1.

* * * * *